(12) United States Patent
Chang

(10) Patent No.: US 9,377,877 B2
(45) Date of Patent: Jun. 28, 2016

(54) METHOD AND DEVICE FOR DETECTING TOUCH SCREEN

(71) Applicant: EGALAX_EMPIA TECHNOLOGY INC., Taipei (TW)

(72) Inventor: Chin-Fu Chang, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 147 days.

(21) Appl. No.: 13/716,653

(22) Filed: Dec. 17, 2012

(65) Prior Publication Data

US 2013/0155015 A1 Jun. 20, 2013

Related U.S. Application Data

(60) Provisional application No. 61/577,175, filed on Dec. 19, 2011.

(51) Int. Cl.
*G06F 3/041* (2006.01)
*G06F 3/0354* (2013.01)
*G06F 3/0488* (2013.01)
*G06F 3/044* (2006.01)

(52) U.S. Cl.
CPC .......... *G06F 3/03545* (2013.01); *G06F 3/044* (2013.01); *G06F 3/0416* (2013.01); *G06F 3/0488* (2013.01)

(58) Field of Classification Search
CPC .......... G06F 3/041; G06F 3/0488; G09G 5/00
USPC .......... 178/19.03; 345/173–174, 179
See application file for complete search history.

(56) References Cited

U.S. PATENT DOCUMENTS

| | | | |
|---|---|---|---|
| 7,847,789 B2 | 12/2010 | Kolmykov-Zotov et al. | |
| 2006/0109252 A1* | 5/2006 | Kolmykov-Zotov et al. | 345/173 |
| 2011/0169756 A1* | 7/2011 | Ogawa et al. | 345/173 |
| 2011/0221695 A1 | 9/2011 | Wu | |

FOREIGN PATENT DOCUMENTS

| | | |
|---|---|---|
| CN | 1797305 | 7/2006 |
| TW | 201131454 | 9/2011 |

* cited by examiner

*Primary Examiner* — Nicholas Lee
*Assistant Examiner* — Abdul-Samad A Adediran
(74) *Attorney, Agent, or Firm* — WPAT, PC; Justin King; Douglas Hosack

(57) ABSTRACT

A detection method and device for a touch screen is provided. When a pen touching or approaching the touch screen is detected, only the location of the pen in a predetermined range is provided, and the locations of all other objects within the predetermined range are not provided, such as the location of a palm. Only if the pen and all the objects in the predetermined range are no longer detected, then the locations of objects other than the pen in the predetermined range are provided again.

10 Claims, 12 Drawing Sheets

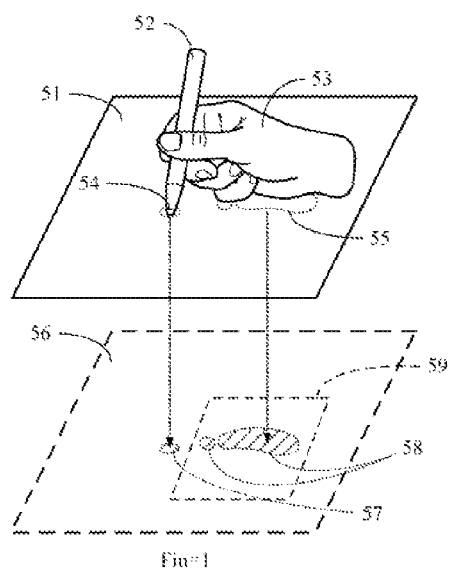
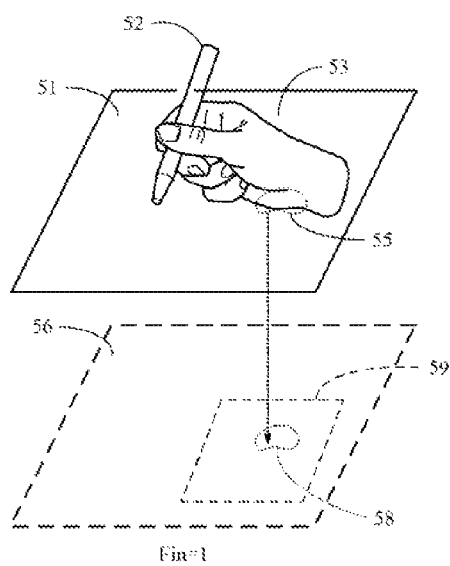
FIG. 5C
FIG. 5D

METHOD AND DEVICE FOR DETECTING
TOUCH SCREEN

CROSS REFERENCE TO RELATED PATENT
APPLICATION

This patent application claims the domestic priority of the U.S. provisional application 61/577,175 filed on Dec. 19, 2011, and hereby incorporated by reference.

BACKGROUND OF THE INVENTION

1. Field of the Invention

The present invention relates to a capacitive writing device, and more particularly, to a cordless capacitive writing device in phase with a touch sensor.

2. Description of the Prior Art

Referring to FIG. 1A, a conventional mutual capacitive sensor 10 is shown, which includes an insulating surface layer 11, a first conductive layer 12, a dielectric layer 13, a second conductive layer 14. The first conductive layer 12 and the second conductive layer 14 have a plurality of first conductive strips and a plurality of second conductive strips, respectively. Each of these conductive strips can be made up by a plurality of conductive pads 15 and connecting lines 19 connected to the conductive pads 15 in series.

In the process of mutual capacitive detection, one of the first conductive layer 12 and the second conductive layer 14 is driven, while the other of the first conductive layer 12 and the second conductive layer 14 is detected. For example, a driving signal is sequentially provided to each first conductive strip, and corresponding to each first conductive strip provided with the driving signal, signals from all of the second conductive strips are detected, which represent capacitive coupling signals at the intersections between the first conductive strip provided with the driving signal and all the second conductive strips. As a result, capacitive coupling signals at the intersections between all the first and second conductive strips are obtained to form an image of capacitive values.

The image of capacitive values at the time when there is no external touches is obtained as a reference. By comparing the difference between the reference image and the image of capacitive values later detected, the touch or approach of an external conductive object can be determined, and furthermore, the position touched or approached by the external conductive object can be determined.

However, the magnitude of this difference between the reference image and the image of capacitive values later detected is proportional to the area on the touch sensor approached or touched by an external conductive object, thus the area must be sufficiently large in order to be identified. Such a limitation therefore dictates the size of the pen head of a passive capacitive pen to be relatively large, preferably larger than 4 mm. The large pen head may block the view of a user from seeing the tip of the pen during writing. As a result, writing may not be accurately made at desired locations.

Moreover, the palm of the user may touch or press on the touch screen during writing, so palm rejection will be performed to ignore the locations of external objects other than that of the pen, but during writing, the pen may temporarily move away from the touch screen, causing the system to think that it should revert back to the hand-detection mode, and thus misjudging the location of the palm as the location of the pen and creating writing errors.

From the above it is clear that prior art still has shortcomings. In order to solve these problems, efforts have long been made in vain, while ordinary products and methods offering no appropriate structures and methods. Thus, there is a need in the industry for a novel technique that solves these problems.

SUMMARY OF THE INVENTION

When a touch sensor is approached or touched by an object of a small area, the corresponding approach or touch signal might be slightly less than the threshold originally used for normal external conductive object detection. An objective of the present invention is to determine an approach or a touch of a small-area object that otherwise would not be detected by the original method by comparing the sum of the corresponding approach or touch signal and some adjacent signals with the threshold.

A conventional passive capacitive pen requires a contact area with the touch sensor large enough to be identified. Such a limitation therefore dictates the size of the pen head of the passive capacitive pen to be relatively large, which results in low accuracy when one wishes to write at a desired location. Another objective of the present invention is therefore to provide a writing experience closer to that of conventional writing on papers by allowing a cordless capacitive pen to send out a signal to the touch sensor. In this way, the pen head of the capacitive pen can be made smaller, and writing can be made more accurately on the desired locations.

During writing, the pen may temporarily move away from the touch screen, causing the system to think that it should revert back to the hand-detection mode, and thus misjudging the location of the palm as the location of the pen and creating writing errors. The present invention provides a detection device and method for a touch screen, which provides only the location of a pen while ignoring the locations of all objects (e.g. the location of a palm) in a predetermined area when an approach or a touch of the pen is detected. Also, only when the pen and other objects are no longer detected in this predetermined area, then it provides the locations of objects other than the pen in the predetermined area.

The above and other objectives of the present invention can be achieved by the following technical scheme. A method for detecting an approach or a touch of a small area proposed by the present invention includes: obtaining an image of change in capacitive coupling from a capacitive touch sensor, wherein the capacitive touch sensor includes a plurality of driven conductive strips driven by a driving signal and a plurality of sensed conductive strips providing changes in capacitive coupling, each time the driving signal is provided, one or more intersections between one or more of the driven conductive strips being simultaneously provided with the driving signal and each sensed conductive strip generate capacitive coupling, and each value in the image of change in capacitive coupling is the change in capacitive coupling for one of the intersections; detecting each detected intersection from the image of change in capacitive coupling, wherein the value of the detected intersection is smaller than a first threshold and larger than a second threshold; detecting each first region, wherein each first region includes one of the detected intersections and an intersection adjacent to the detected intersection, and the sum of values of the first region is greater than the first threshold; detecting each second region if no first region is detected, wherein each second region includes four adjacent intersections including one of the detected intersections, and the sum of values of the second region is greater than the first threshold; and determining a first region or a second region approached or touched by an external conductive object when at least one first region or at least one second region is detected, wherein the values of all intersections adjacent to the first region or the second region approached or touched by the external conductive object are all smaller than a third threshold.

The above and other objectives of the present invention can further be achieved by the following technical scheme. A device for detecting an approach or a touch of a small area proposed by the present invention includes: a means for obtaining an image of change in capacitive coupling from a capacitive touch sensor, wherein the capacitive touch sensor includes a plurality of driven conductive strips driven by a driving signal and a plurality of sensed conductive strips providing changes in capacitive coupling, each time the driving signal is provided, one or more intersections between one or more of the driven conductive strips being simultaneously provided with the driving signal and each sensed conductive strip generate capacitive coupling, and each value in the image of change in capacitive coupling is the change in capacitive coupling for one of the intersections; a means for detecting each detected intersection from the image of change in capacitive coupling, wherein the value of the detected intersection is smaller than a first threshold and larger than a second threshold; a means for detecting each first region, wherein each first region includes one of the detected intersections and an intersection adjacent to the detected intersection, and the sum of values of the first region is greater than the first threshold; a means for detecting each second region if no first region is detected, wherein each second region includes four adjacent intersections including one of the detected intersections, and the sum of values of the second region is greater than the first threshold; and a means for determining a first region or a second region approached or touched by an external conductive object when at least one first region or at least one second region is detected, wherein the values of all intersections adjacent to the first region or the second region approached or touched by the external conductive object are all smaller than a third threshold.

The above and other objectives of the present invention can further be achieved by the following technical scheme. A method for detecting an approach or a touch of a small area proposed by the present invention includes: obtaining an image of change in capacitive coupling from a capacitive touch sensor, wherein the capacitive touch sensor includes a plurality of driven conductive strips driven by a driving signal and a plurality of sensed conductive strips providing changes in capacitive coupling, each time the driving signal is provided, one or more intersections between one or more of the driven conductive strips being simultaneously provided with the driving signal and each sensed conductive strip generate capacitive coupling, and each value in the image of change in capacitive coupling is the change in capacitive coupling for one of the intersections; detecting each detected intersection from the image of change in capacitive coupling, wherein the value of the detected intersection is smaller than a first threshold and larger than a second threshold; detecting each first region, wherein each first region includes one of the detected intersections and an intersection adjacent to the detected intersection, and the sum of values of the first region is greater than the first threshold; and when at least one first region is detected, detecting a first region approached or touched by an external conductive object, wherein the values of all intersections adjacent to the first region approached or touched by the external conductive object are all smaller than a third threshold.

The above and other objectives of the present invention can further be achieved by the following technical scheme. A device for detecting an approach or a touch of a small area proposed by the present invention includes: a means for obtaining an image of change in capacitive coupling from a capacitive touch sensor, wherein the capacitive touch sensor includes a plurality of driven conductive strips driven by a driving signal and a plurality of sensed conductive strips providing changes in capacitive coupling, each time the driving signal is provided, one or more intersections between one or more of the driven conductive strips being simultaneously provided with the driving signal and each sensed conductive strip generate capacitive coupling, and each value in the image of change in capacitive coupling is the change in capacitive coupling for one of the intersections; a means for detecting each detected intersection from the image of change in capacitive coupling, wherein the value of the detected intersection is smaller than a first threshold and larger than a second threshold; a means for detecting each first region, wherein each first region includes one of the detected intersections and an intersection adjacent to the detected intersection, and the sum of values of the first region is greater than the first threshold; and a means for detecting a first region approached or touched by an external conductive object when at least one first region is detected, wherein the values of all intersections adjacent to the first region approached or touched by the external conductive object are all smaller than a third threshold.

The above and other objectives of the present invention can further be achieved by the following technical scheme. A method for detecting an approach or a touch of a small area proposed by the present invention includes: obtaining an image of change in capacitive coupling from a capacitive touch sensor, wherein the capacitive touch sensor includes a plurality of driven conductive strips driven by a driving signal and a plurality of sensed conductive strips providing changes in capacitive coupling, each time the driving signal is provided, one or more intersections between one or more of the driven conductive strips being simultaneously provided with the driving signal and each sensed conductive strip generate capacitive coupling, and each value in the image of change in capacitive coupling is the change in capacitive coupling for one of the intersections; detecting each intersection with a value greater than a first threshold from the image of change in capacitive coupling; and determining a single intersection of an approach or a touch of a small area by each external conductive object when at least one intersection with the value greater than the first threshold is detected, wherein all intersections adjacent to the single intersection of the approach or touch of a small area by each external conductive object are all smaller than the first threshold.

The above and other objectives of the present invention can further be achieved by the following technical scheme. A capacitive writing device proposed according to the present invention includes: a capacitive pen including a conductive pen body and a conductive pen head in contact with the conductive pen body, and the conductive pen head including a contact portion and a non-contact portion, wherein the contact portion is softer than the non-contact portion, and the conductive pen head is made of bonded conductive fibers, some or all of which extend from the non-contact portion to the contact portion; a touch sensor including a plurality of driven conductive strips provided with a driving signal and a plurality of sensed conductive strips providing changes in capacitive coupling, each time the driving signal being provided, one or more intersections between one or more of the driven conductive strips being simultaneously provided with the driving signal and each sensed conductive strip generating capacitive coupling; and a control circuit for determining the location of the capacitive pen on the touch sensor based on the changes in capacitive coupling produced at the intersections when the capacitive pen is held on the touch sensor by an external conductive object.

The above and other objectives of the present invention can further be achieved by the following technical scheme. A cordless capacitive writing device proposed by the present invention may include: a touch sensor including a plurality of conductive strips including a plurality of first conductive strips and a plurality of second conductive strips; a capacitive pen including a conductive pen head and a signal conversion circuit, the conductive pen head for receiving a driving signal from the touch sensor, and the signal conversion circuit for generating a delayed driving signal after delaying a predefined period of time based on the driving signal, the delayed driving signal being transmitted to the touch sensor through the conductive pen head, wherein the driving signal and the delayed driving signal have the same frequency and phase; and a controller for detecting the location of at least one external conductive object based on a change in capacitive coupling of the driving signal between the touch sensor and the at least one external conductive object in a passive mode, and detecting the location of at least one external conductive object based on the delayed driving signal received from the capacitive pen in an active mode.

The above and other objectives of the present invention can further be achieved by the following technical scheme. A detection device for a touch screen is proposed by the present invention, which may include: the touch screen for detecting signals indicating approaches or touches thereon by external conductive objects; a controller for, when determining at least one external conductive object is a pen based on the signals on the touch screen, recording the location of each pen and areas touched or approached by one or more external conductive objects other than the pen in a predetermined range of the location of each pen; and a memory for storing a flag corresponding to the location of each pen, each flag corresponding to the predetermined range of the location of the corresponding pen, a corresponding flag being set to a true value when the existence of the corresponding pen is detected by the controller, and a corresponding flag being set to a false value only if the existence of the corresponding pen is not detected and the existence of any external conductive object other than the pen in the corresponding predetermined range are not detected by the controller, wherein the locations of all external conductive objects in each predetermined range corresponding to a flag set as the true value are not provided by the controller.

The above and other objectives of the present invention can further be achieved by the following technical scheme. A detection method for a touch screen is proposed by the present invention, which may include the steps of: providing signals indicating approaches or touches of external conductive objects on a touch screen; when determining at least one external conductive object is a pen based on the signals on the touch screen, recording the location of each pen and areas touched or approached by one or more external conductive objects other than the pen in a predetermined range of the location of each pen; providing a flag corresponding to the location of each pen, and each flag corresponding to the predetermined range of the location of the corresponding pen; setting a corresponding flag to a true value when the location of the pen is detected; setting a corresponding flag to a false value only if the location of the corresponding pen is not detected and any external conductive object other than the pen in the corresponding predetermined range are not detected, and providing the location of each pen and the location of each external conductive object in the predetermined range corresponding to each flag being set as the true value.

With the above technical schemes, the present invention achieve at least the following advantages and beneficial effects:

1. The approach or touch of a pen head with an area smaller than traditional capacitive pens can be detected;
2. The approach of an external conductive object with a smaller area suspending in the air can be detected;
3. Writing can be made more accurately at the expected locations, which provides a writing experience more similar to that of conventional writing on papers; and
4. When a palm is touch a touch screen during writing, palm rejection can still be performed even when the pen temporarily leaves the touch screen.

BRIEF DESCRIPTION OF THE DRAWINGS

The present invention can be more fully understood by reading the following detailed description of the preferred embodiments, with reference made to the accompanying drawings, wherein:

FIGS. 2B to 2G are schematic diagrams illustrating a first region and a second region according to the first embodiment of the present invention;

FIGS. 5A to 5F are schematic diagrams illustrating a writing method with palm rejection in accordance with a fourth embodiment of the present invention.

DETAILED DESCRIPTION OF THE PREFERRED EMBODIMENTS

Figure 1A:
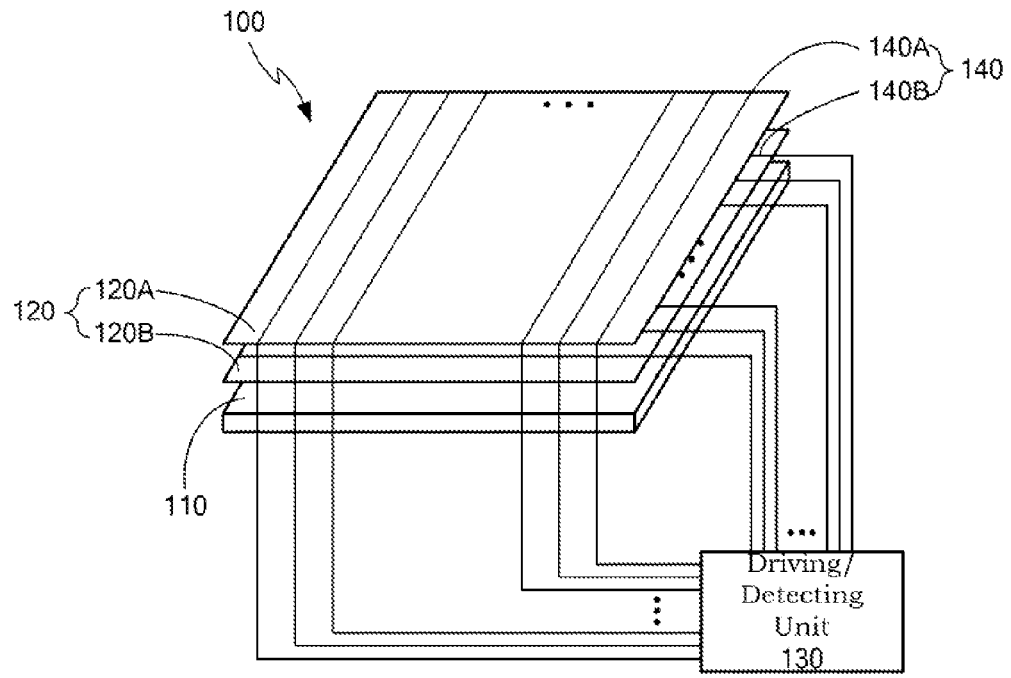
FIGS. 1A and 1B are schematic diagrams illustrating a mutual capacitive sensor.

Some embodiments of the present invention are described in details below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

Referring to FIG. 1A, the present invention provides a position detecting device 100, which includes a sensing device 120 and a driving/detecting unit 130. The sensing device 120 has a sensing layer. In an example of the present invention, the sensing layer can include a first sensing layer 120A and a second sensing layer 120B. The first and second sensing layers 120A and 120B each has a plurality of conductive strips 140, wherein the first conductive strips 140A of the first sensing layer 120A and the second conductive strips 140B of the second sensing layer 120B cross each other. In another example of the present invention, the first and second conductive strips 140A and 140B are disposed on a co-planar sensing layer. The driving/detecting unit 130 produces sensing information based on signals of the conductive strips 140. In the case of self-capacitive detection, for example, conductive strips 140 that are being driven are detected. In the case of mutual-capacitive detection, some of the conductive strips 140 that are not being directly driven by the driving/detecting unit 130 are detected. In addition, the sensing device 120 can be disposed on a display 110. An optional rear shielding layer (not shown) can be interposed between the sensing device 120 and the display 110. In a preferred example of the present invention, there is no rear shielding layer between the sensing device 120 and the display 110 so as to reduce the thickness of the sensing device 120.

The first and second conductive strips can be a plurality of column conductive strips and row conductive strips arranged in columns and rows; a plurality of first dimensional conductive strips and second dimensional conductive strips arranged in first and second dimensions; or a plurality of first axial conductive strips and second axial conductive strips arranged in first and second axes. In addition, the first and second conductive strips can be arranged in orthogonal or non-orthogonal directions. For example, in a polar coordinate system, one of the first and second conductive strips can be arranged in radial direction, and the other one of the first and second conductive strips can be arranged in circular direction. Furthermore, one of the first and second conductive strips can be driving conductive strips, while the other one of the first and second conductive strips can be detecting conductive strips. Said "first dimension" and "second dimension", "first axis" and "second axis", "driving" and "detecting", "driven" or "detected" conductive strips can be used to mean said "first and "second" conductive strips, including but not limited to, being arranged in orthogonal grids, and in any other geometric configurations comprising first dimensional and second dimensional intersecting conductive strips.

Figure 1B:
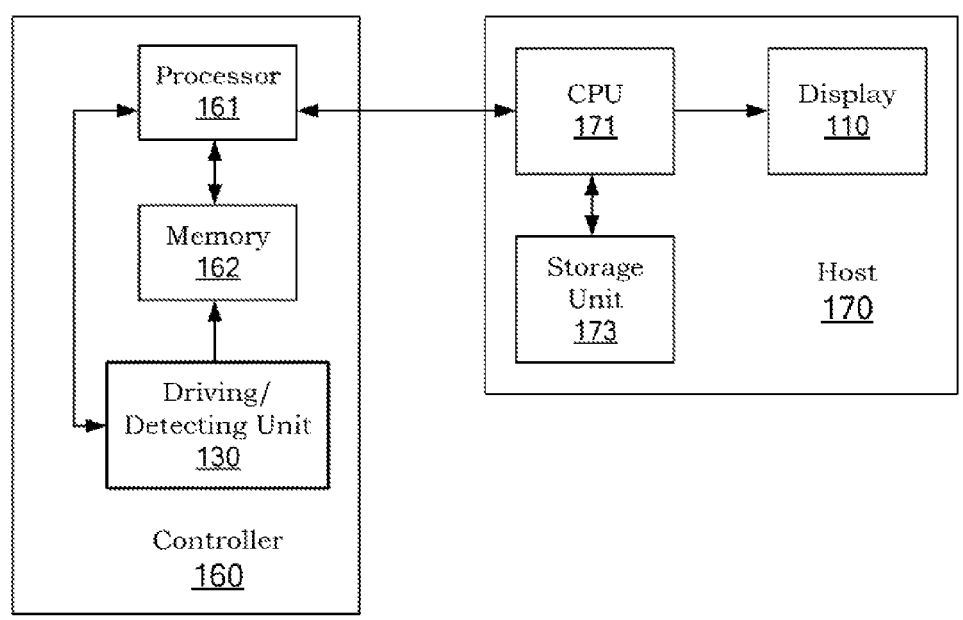

The position detecting device 100 of the present invention can be applied to a computing system as shown in FIG. 1B, which includes a controller 160 and a host 170. The controller includes the driving/detecting unit 130 to operatively couple the sensing device 120 (not shown). In addition, the controller 160 can include a processor 161 for controlling the driving/detecting unit 130 in generating the sensing information. The sensing information can be stored in a memory 162 and accessible by the processor 161. Moreover, the host 170 constitutes the main body of the computing system, and mainly includes a central processing unit 171, a storage unit 173 that can be accessed by the central processing unit 171, and the display 110 for displaying results of operations.

In another example of the present invention, there is a transmission interface between the controller 160 and the host 170. The controlling unit transmits data to the host via the transmission interface. One with ordinary skill in the art can appreciate that the transmission interface may include, but not limited to, UART, USB, I2C, Bluetooth, Wi-Fi, IR and other wireless or wired transmission interfaces. In an example of the present invention, data transmitted can be positions (e.g. coordinates), identified results (e.g. gesture codes), commands, sensing information or other information provided by the controller 160.

In an example of the present invention, the sensing information can be initial sensing information generated under the control of the processor 161, and this information is passed onto the host 170 for position analysis, such as position analysis, gesture determination, command identification, and so on. In another example of the present invention, the sensing information can be analyzed by processor 161 first before forwarding the determined positions, gestures, commands, or the like to the host 170. The present invention does not limit to this example, and one with ordinary skill in the art can readily recognize other interactions between the controller 160 and the host 170.

At each intersection of the conductive strips, the upper and lower conductive strips form the positive and negative electrodes. Each intersection can be regarded as one pixel in an image. When one or more external conductive objects approach or touch the sensing device, said image can be regarded as a photographed touch image (e.g. the pattern of a finger upon touching the sensing device).

When a driven conductive strip is being provided with a driving signal, the driven conductive strip itself produces self capacitance, and produces mutual capacitance on each intersection of the driven conductive strip. Said self-capacitive detection is detecting the self-capacitance of all the conductive strips, which is particularly useful in determining approach or touch of a single external conductive object.

In said mutual-capacitive detection, when a driven conductive strip is being provided with a driving signal, capacitances or changes in capacitances of all intersections on the driven conductive strip are detected with all sensed conductive strips arranged in different dimensions to the driven conductive strip, and are regarded as a row of pixels. Accordingly, all the rows of pixels are combined to form said image. When one or more external conductive objects approach or touch the sensing device, said image can be regarded as a photographed touch image, which is particularly useful in determining approaches or touches of a plurality of external conductive objects.

These conductive strips (the first and second conductive strips) can be made of transparent or opaque materials, such as transparent Indium Tin Oxide (ITO). In terms of the structure, it can be categorized into a Single ITO (SITO) structure and a Double ITO (DITO) structure. One with ordinary skill in the art can appreciate that other materials can be used as the conductive strips, such as carbon nanotube, and they will not be further described.

In an example of the present invention, the horizontal direction is regarded as the first direction, while the vertical direction is regarded as the second direction. Thus, the horizontal conductive strips are the first conductive strips, and the vertical conductive strips are the second conductive strips. However, one with ordinary skill in the art can appreciate that the above is merely an example of the present invention, and the present invention is not limited to this. For example, the vertical direction can be regarded as the first direction, while the horizontal direction can be regarded as the second direction.

During 2D mutual capacitive detection, alternating driving signals are sequentially provided to each first conductive strip, and 1D sensing information corresponding to each driven first conductive strip is obtained from the signals of the second conductive strips. Sensing information of all the first conductive strips are combined together to form 2D sensing information. 1D sensing information can be generated based on the signal of a second conductive strip, or based on the difference between the signal of a conductive strip and a reference value. In addition, the sensing information can be generated based on current, voltage, level of capacitive coupling, amount of charge or other electrical characteristics, and can be in analog or digital form.

When there is no external object actually approaching or covering the touch screen, or when the system has not determined any external object actually approaching or covering the touch screen, the position detecting device may generated a reference value based on the signals of the second conductive strips. This reference value represents stray capacitance on the touch screen. Sensing information can be generated based on the signal of a second conductive strip or the result of subtracting the reference value from the signal of the second conductive strip.

In the prior art, capacitive pens are often used as an extension for the hands. The contact area of the pen with the touch screen has to be about the same as that of a finger with the touch screen under normal circumstances in order to obtain sufficient changes in signals and to correctly determine the position of the touch. This area should cover the intersections of several conductive strips.

Figure 1C:
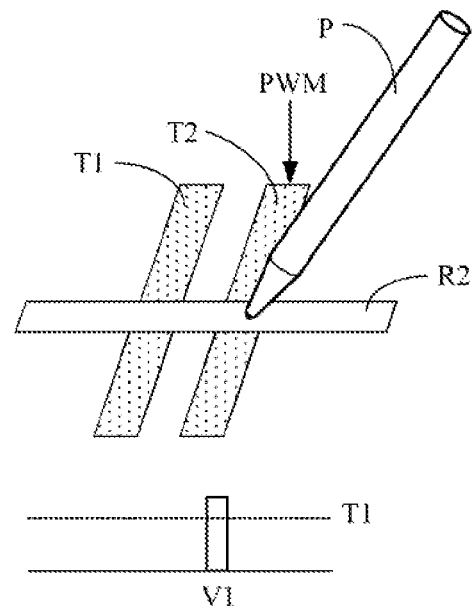
FIGS. 1C to 1E are schematic diagrams illustrating a touch sensor approached or touched by a capacitive pen with a small pen head according to a first embodiment of the present invention.
Figure 1D:
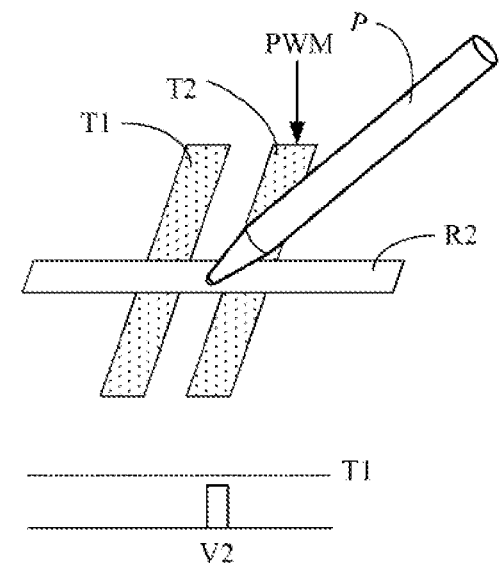
Figure 1E:
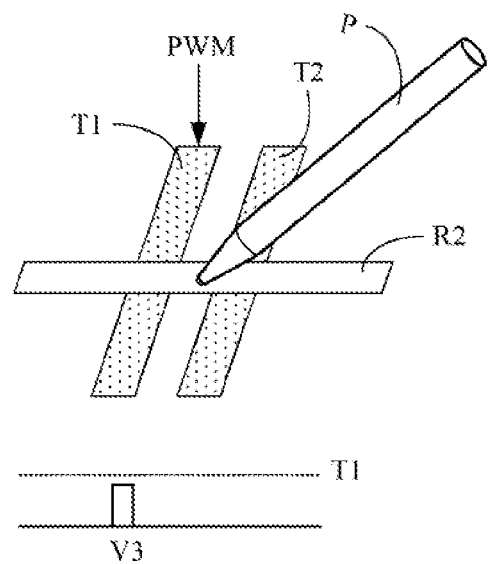

Referring to FIGS. 1C to 1E, a capacitive pen with a small pen head according to a first embodiment is shown. The pen head and the pen body of the capacitive pen P are in contact with each other, such that a hand holding the pen body can be capacitive coupled to a touch screen via the pen head. In addition, the diameter of the contact area of the pen head of the capacitive pen P with the touch screen is less than about 3 mm. In a preferred example of the present invention, the diameter of the contact area of the pen head of the capacitive pen P with the touch screen is about 2.2 mm. During mutual capacitive detection, when a driving signal (e.g. a pulse-width modulation (PWM) signal) is provided to a first conductive strip (e.g. a first conductive strip T2), changes in capacitive coupling at each intersection on the first conductive strip is detected through each second conductive strip (e.g. a second conductive strip R2) intersecting the first conductive strip. When the capacitive pen P approaches or touches an intersection (e.g. the intersection of the first conductive strip T2 and the second conductive strip R2), the detected change in capacitive coupling V1 may be larger than a first threshold T1. However, if the capacitive pen P moves to a place between two intersections (e.g. between the intersection of the first conductive strip T1 and the second conductive strip R2 and the intersection of the first conductive strip T2 and the second conductive strip R2), then the changes in capacitive coupling V2 and V3 at the two intersections may be lower than the first threshold T1. As a result, the position of the pen cannot be determined.

Figure 1F:
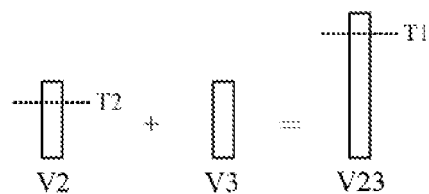
FIGS. 1F to 1G are schematic diagrams illustrating determining of an approach or a touch by a capacitive pen with a small pen head according to the first embodiment of the present invention.
Figure 1G:
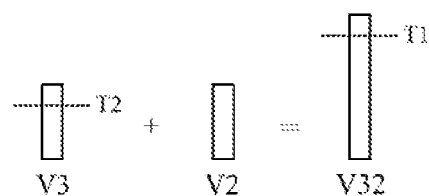

In view of this, referring to FIGS. 1F and 1G, the present invention proposes that when the change in capacitive coupling at an intersection is larger than a second threshold but lower than the first threshold, then by determining whether the sum of the changes in capacitive coupling at adjacent intersections is larger than a threshold, it is determined whether the position of the capacitive pen P is between intersections.

In an example of the present invention, the sum of the changes in capacitive coupling at adjacent intersections may include the sum of the changes in capacitive coupling for one or more adjacent intersections on the same driven conductive strip (first conductive strip). For example, when a first conductive strip is provided with a driving signal, sensing information corresponding to this first conductive strip is formed from the changes in capacitive coupling detected from a plurality of consecutive second conductive strips. If a value in the sensing information is larger than the second threshold but less than the first threshold, then this value in the sensing information and a previous or a subsequent value is added together for comparing with the first threshold.

In another example of the present invention, sensing information (1D sensing information) corresponding to a plurality of conductive strips form an image (2D sensing information). Each value in the sensing information that is larger than the second threshold but less than the first threshold is the sum of the changes in capacitive coupling at adjacent intersections in the image.

Figure 2A:
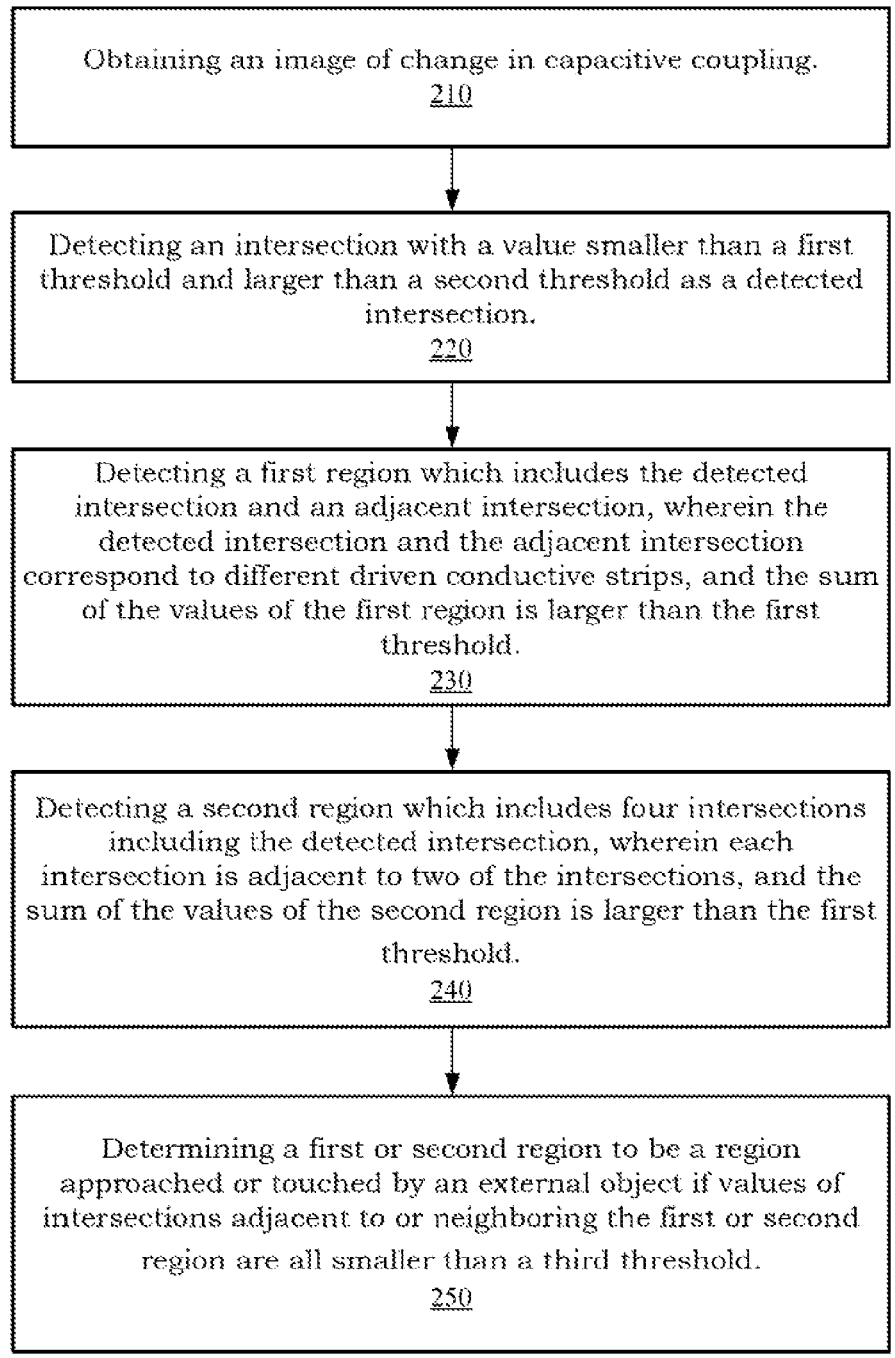
FIG. 2A is a flowchart illustrating detecting of an approach or a touch of a small area according to the first embodiment of the present invention.

Moreover, referring to FIG. 2A, a method for detecting a capacitive pen with a small pen head according to this embodiment is shown. As shown in step 210, an image of change in capacitive coupling is obtained. More specifically, first, an image can be obtained when the touch screen is not approached or touched by any external object. This image is used as a reference image. Then, images are obtained one or several consecutive times. The difference between each obtained image and the reference image is the image of change in capacitive coupling. Values of the image of change in capacitive coupling correspond to a plurality of driven conductive strips (first conductive strips). A value corresponding to each driven conductive strip is generated based on a plurality of sensed conductive strips. Each driven conductive strip (e.g. a first conductive strip) and sensed conductive strip (e.g. a second conductive strip) may correspond to a horizontal coordinate and a vertical coordinate, respectively. Each time a driving signal is provided to a driven conductive strip, the coordinates of each intersection on the driven conductive strip is a 2D coordinate intersected by overlapping driven conductive strip and sensed conductive strip. The 2D coordinate can be written, for example, as (coordinate of the driven conductive strip, coordinate of the sensed conductive strip).

In an example of the present invention two or more adjacent driven conductive strips can be driven simultaneously. For example, when there are N first conductive strips, the driving signal is provided to two adjacent first conductive strips simultaneously at a time, and at least one of the two first conductive strips is not the same between each driving, The conductive strips are driven N-1 times. Compared to the example of driving only one first conductive strip each time that generates an image of change in capacitive coupling (2D sensing information) consisting of N 1D sensing information, driving two adjacent first conductive strips simultaneously at a time will generate an image of change in capacitive coupling consisting of N-1 1D sensing information. In this example, the coordinates for each intersection are effectively a 2D coordinate consisting of the coordinate at the middle of two adjacent driven conductive strips and the coordinate of a sensed conductive strip.

Next, in step 220, each intersection with a value smaller than a first threshold and larger than a second threshold is detected as a detected intersection. Then, in step 230, each first region is detected, which includes the detected intersection and an adjacent intersection. The detected intersection and the adjacent intersection correspond to different driven conductive strips. The sum of the values of the first region (sum of the detected intersection and the adjacent intersection) is larger than the first threshold. Next, in step 240, each second region is detected. The second region encompasses four intersections (including the detected intersection and three other intersections). Each intersection in the second region is adjacent to two other intersections in the second region, and the sum of the values of the second region (sum of the detected intersection and the other three intersections) is larger than the first threshold. In an example of the present invention, the second region is detected if no first region is detected. In another example of the present invention, the second region is detected regardless of whether a first region is detected or not. In step 250, when values of intersections adjacent to or neighboring the first region or the second region are all smaller than a third threshold, then the first or second region is determined to be a region approached or touched by an external conductive object.

Referring to FIGS. 2B to 2G, the matrix shown indicates intersections (intersection 00, intersection 01, . . . intersection 04, intersection 10, intersection 11, . . . intersection 44) of five first conductive strips (driven conductive strips) and five second conductive strips (sensed conductive strips), wherein the intersections 00, 01, 02, 03 and 04 are intersections on the first conductive strip T0; the intersections 10, 11, 12, 13 and 14 are intersections on the first conductive strip T1; and so on.

Figures 2B, 2C, 2D, 2E, 2F, 2G:
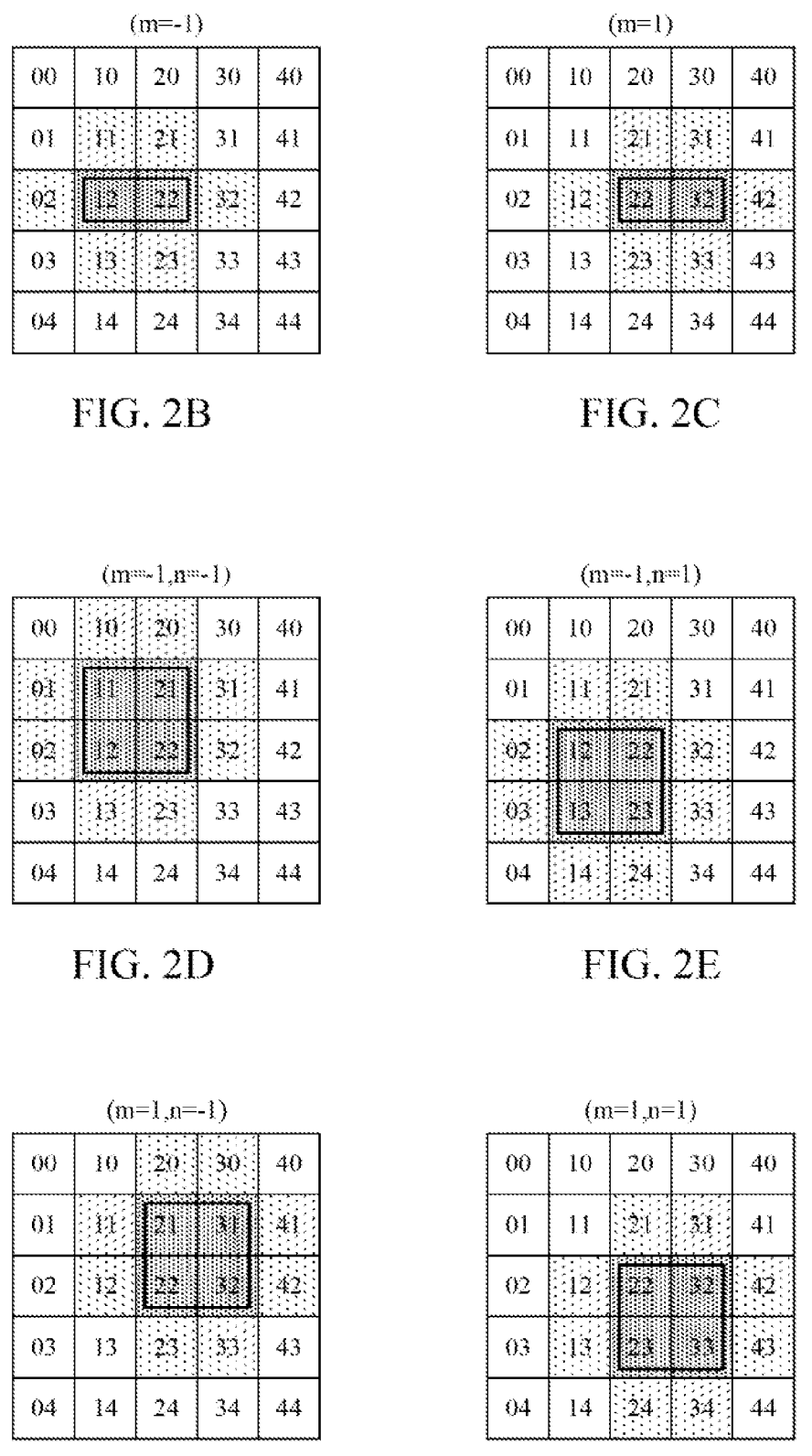

Under the assumption that the intersection 22 is detected as the detected intersection in step 220, then in step 230, possible first regions are shown in FIGS. 2B and 2C, which include the intersections 12 and 22, and the intersections 22 and 32, respectively. If the sum of values of the intersections 12 and 22 is greater than the first threshold, then the intersections 12 and 22 are detected as the first region. Alternatively, if the sum of values of the intersections 22 and 32 is greater than the first threshold, then the intersections 22 and 32 are detected as the first region. On the contrary, if neither the sum of values of the intersections 12 and 22 nor the sum of values of the intersections 22 and 32 is greater than the first threshold, then no first region is detected.

Furthermore, in step 240, possible second regions are shown in FIGS. 2D to 2G, which include the intersections 11, 12, 21 and 22 in FIG. 2D; the intersections 12, 13, 22 and 23 in FIG. 2E; the intersections 21, 22, 31 and 32 in FIG. 2F; and the intersections 22, 23, 32 and 33 in FIG. 2G. If the sum of values of the four intersections in any of FIGS. 2D to 2G is greater than the first threshold, then a second region is detected. Otherwise, if none of the sum of values of the four intersections in FIGS. 2D to 2G is greater than the first threshold, no second region is detected.

In addition, in step 250, assuming the first region is detected as shown in FIG. 2B, then in an example of the present invention, the neighboring intersections of the first regions can be intersections 02, 11, 13, 21, 23 and 32; in another example of the present invention, the neighboring intersections of the first regions can be intersections 01, 02, 03, 11, 13, 21, 23, 31, 32 and 33. The neighboring intersections of the regions shown in FIGS. 2C to 2G can be similarly deduced, and will not be further explained.

Moreover, in a best mode of the present invention, the second threshold and the third threshold are ½ and ¼ of the first threshold, respectively, and wherein the first threshold>the second threshold>the third threshold. One with ordinary skill in the art can appreciate other first, second and third threshold values; the present invention is not limited to the magnitudes described herein.

In a preferred example of the present invention, the pen head of the capacitive pen is thin with a width between about 2 mm~3 mm, which is less than the minimum gap between two parallel conductive strips or two parallel driven conductive strips. For example, the width of the pen head is less than the gap between the center of a conductive strip and the center of another conductive strip, or less than the gap between the center of a first conductive strip and the center of another adjacent first conductive strip.

An algorithm provided based on FIG. 2A is as follows. DD[i][j] indicates an intersection detected in step 220.

```
if( g_ComtParam.m_Ctrl & CTRL_PEN_DETECTION )
{
    if( DD[i][j] > 0 )
    {
        for( m = -1; m <= 1; m+=2 )
        {
            if( DD[i+m][j] > TOUCHTHRESHOLD/2 )
            {
                Sum = DD[i][j] + DD[i+m][j];
                if( Sum >= TOUCHTHRESHOLD )
                {
                    if(  DD[i][j-1] <= TOUCHTHRESHOLD/4 &&
                         DD[i][j+1] <= TOUCHTHRESHOLD/4 &&
                         DD[i+m][j-1] <= TOUCHTHRESHOLD/4
                         &&
                         DD[i+m][j+1] <= TOUCHTHRESHOLD/4
                         &&
                         DD[i+2*m][j] <= TOUCHTHRESHOLD/4
                         &&
                         DD[i-m][j] <= TOUCHTHRESHOLD/4 )
                    {
                        bDetected = 1;      //signal is detected
                        goto EndDetectLinePcs;
                    }
                }
            }
        }
        for( n = -1; n <= 1; n+=2 )
        {
            if( DD[i][j+n] >= 0 &&
                DD[i+m][j] >= 0 &&
                DD[i+m][j+n] >= 0 )
            {
                Sum =   DD[i][j]+
                        DD[i][j+n]+
                        DD[i+m][j]+
                        DD[i+m][j+n];
                if( Sum >= TOUCHTHRESHOLD )
                {
                    if( DD[i][j+2*n] <=
                        TOUCHTHRESHOLD/4 &&
                        DD[i][j-n] <= TOUCHTHRESHOLD/4
                        &&
                        DD[i+m][j+2*n]<= TOUCHTHRESHOLD/4 &&
                        DD[i+m][j-n] <= TOUCHTHRESHOLD/4 &&
                        DD[i+2*m][j+n] <= TOUCHTHRESHOLD/4 &&
                        DD[i+2*m][j] <= TOUCHTHRESHOLD/4 &&
                        DD[i-m][j+n] <= TOUCHTHRESHOLD/4 &&
                        DD[i-m][j] <= TOUCHTHRESHOLD/4 )
                    {
                        bDetected = 1;      // signal is detected
                        goto EndDetectLinePcs;
                    }
                }
            }
        }
    }
}
```

Based on the descriptions above, the present invention provides a device for detecting an approach or a touch of a small area. According to step 210 above, the present invention includes a means for obtaining an image of change in capacitive coupling from a capacitive touch sensor. The capacitive touch sensor includes a plurality of driven conductive strips driven by a driving signal and a plurality of sensed conductive strips providing changes in capacitive coupling. Each time the driving signal is provided, one or more intersections between one or more of the driven conductive strips being simultaneously provided with the driving signal and each sensed conductive strip generate capacitive coupling. Each value in the image of change in capacitive coupling is the change in capacitive coupling for one of the intersections.

According to step 220, the present invention includes a means for detecting each detected intersection from the image of change in capacitive coupling, wherein the value of the detected intersection is smaller than a first threshold and larger than a second threshold.

According to step 230, the present invention includes a means for detecting each first region, wherein each first region includes one of the detected intersections and an intersection adjacent to the detected intersection, and the sum of values of the first region is greater than the first threshold.

According to step 240, the present invention includes a means for detecting each second region, wherein each second region includes four adjacent intersections including one of the detected intersections, and the sum of values of the second region is greater than the first threshold. As described before, the second region is detected only if no first region is detected. Alternatively, the second region is detected regardless of whether first region is detected or not.

According to step 250, the present invention includes a means for determining a first or second region approached or touched by an external conductive object when at least one first region or at least one second region is detected, wherein the values of all intersections adjacent to the first region or the second region approached or touched by the external conductive object are all smaller than a third threshold.

The above touch sensor may include a plurality of driven conductive strips driven by a driving signal and a plurality of sensed conductive strips providing changes in capacitive coupling. Each time the driving signal is provided, one or more intersections between one or more of the driven conductive strips being simultaneously provided with the driving signal and each sensed conductive strip generates capacitive coupling. Based on the capacitive coupling, the sensed conductive strips provide changes in capacitive coupling for the intersections. Each value in the image of change in capacitive coupling is the change in capacitive coupling for one of the intersections.

As described before, in an example of the present invention, the first threshold>the second threshold>the third threshold. For example, the second threshold is ½ of the first threshold, and the third threshold is ¼ of the first threshold. In addition, in a best mode of the present invention, the maximum width of the approach or touch of a small area is less than or equal to the gap between the centers of two adjacent conductive strips. For example, the maximum width of the approach or touch of a small area is less than or equal to 3 mm, and the gap between the centers of two adjacent conductive strips is below 6.5 mm. The two adjacent conductive strips may be two driven conductive strips or sensed conductive strips arranged adjacent and in parallel with each other.

The above maximum width of the approach or touch of a small area means the maximum width of an applicable range for detecting an approach or a touch of a small area used by the touch sensor of the present invention, rather than the maximum width for detecting an approach or a touch of an external conductive object by the touch sensor of the present invention. When the approach or touch of an external conductive object is larger than the maximum width of an approach or a touch of a small area, normal detecting method can be used for detecting. For example, detecting without determining the first region or the second region. As such, the present invention may detect the approach or touch of ordinary external conductive objects, and also detect the approach or touch of external conductive objects with small areas. For example, when the external conductive object is a pen, the coupled area on the touch sensor caused by a touch or an approach of the pen is less than or equal to the above maximum width of an approach or a touch of a small area. As another example, when an external conductive object approaches (suspends in the air) above the touch sensor, the area of capacitive coupling between the external conductive object and the touch sensor would be relatively smaller than the area of capacitive coupling with the touch sensor while the external conductive object is touching the touch sensor. When the area of capacitive coupling on the touch sensor which an external conductive object is capable of causing is less than or equal to the above maximum width of an approach or a touch of a small area, it can be regarded as the approaching of an external conductive object of a small area.

Accordingly, an example of the present invention further includes: detecting each intersection with a value larger than a first threshold from an image of change in capacitive coupling, and when at least one intersection with a value larger than the first threshold is detected, determining a single intersection of an approach or a touch of a small area for each external conductive object, wherein all intersections adjacent to the single intersection of the approach or touch of a small area for each external conductive object are smaller than the first threshold.

In an example of the present invention, step 250 may be performed after step 230. Step 250 may also be performed after step 240. In another example of the present invention, step 250 is performed after both steps 230 and 240 are completed.

Figure 3A:
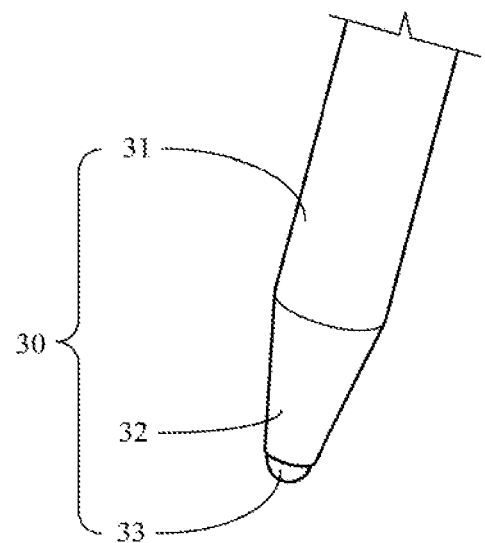
FIGS. 3A and 3B are schematic diagrams illustrating a capacitive pen proposed by a second embodiment of the present invention.
Figure 3B:
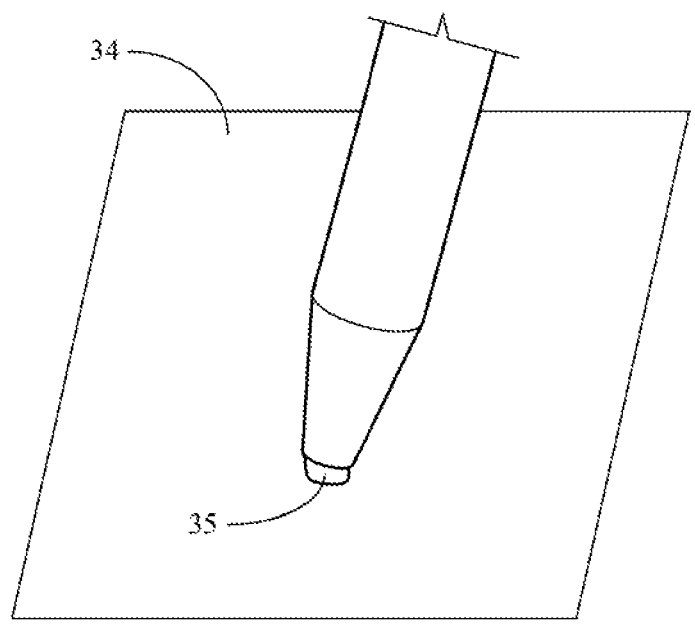

Referring to FIGS. 3A and 3B, a capacitive pen 30 proposed by a second embodiment of the present invention is shown. The capacitive pen 30 includes a conductive pen body 31 and a conductive pen head 32. The conductive pen head is in physical contact with the conductive pen body, such that when the conductive pen body is in contact with the hand or person holding the pen, the conductive pen head is coupled to the hand or human body via the conductive pen body, and is further coupled to ground through the human body. In an example of the present invention, the conductive pen head 32 is made by curing conductive fibers, for example, by optical or thermal curing after being bonded together. In addition, the conductive pen head 32 further includes a contact portion 33, wherein the degree of curing of the contact portion 33 is different from that of other non-contact portion of the conductive pen head 32. More specifically, the contact portion 33 is softer than the non-contact portion of the conductive pen head 32. When the capacitive pen 30 is used for writing on a touch sensor 34, the contact portion 33 may deform due to friction force or touch pressure, resulting in a deformed touch portion 35, thereby increasing its contact area. In a preferred example of the present invention, the diameter of contact between the contact portion 33 and the second conductive pads 34 is between 3 mm to 1 mm. In an example of the present invention, the conductive pen head is made of collecting conductive fibers that extend in the same direction as the conductive pen body. In other words, each conductive fiber extends from the conductive pen body towards the tip of the pen; some or all of the conductive fibers extend from the non-contact portion to the contact portion. The bonding of the conductive fibers can be achieved by conductive adhesives. One with ordinary skill in the art may appreciate the various materials of the conductive fibers (e.g. conductive polyester, conductive polyamine etc.) and the conductive adhesives (e.g. UV cured conductive adhesives); and they will not be described in details herein.

Moreover, the conductive pen head may further include a conductive support (not shown). The conductive support can be made of metal or non-metal materials, for example, a copper rod or a graphite rod. In addition, the tip of the contact portion may further include a recessed portion providing a space recessed into the contact portion 33, which gives a larger area than a non-recessed tip. The contact portion 33 may be of a cone shape, wherein the above recess is provided at the top of the cone.

In an example of the present invention, the maximum width of contact between the contact portion 33 and the second conductive pads 34 is less than the distance between the center lines of two conductive strips arranged in parallel on the touch sensor 34. In an example of the present invention, the contact portion 33 touches two parallel conductive strips at most. In another example of the present invention, the contact portion 33 touches two adjacent intersections at most.

Accordingly, a capacitive writing device is proposed by the present invention, which includes a capacitive pen, a touch sensor and a control circuit. The capacitive pen includes a conductive pen body and a conductive pen head in contact with the conductive pen body, and the conductive pen head includes a contact portion and a non-contact portion, wherein the contact portion is softer than the non-contact portion, and the conductive pen head is made of bonded conductive fibers, some or all of which extend from the non-contact portion to the contact portion. In addition, the touch sensor includes a plurality of driven conductive strips provided with a driving signal and a plurality of sensed conductive strips providing changes in capacitive coupling. Each time the driving signal is provided, one or more intersections between one or more of the driven conductive strips being simultaneously provided with the driving signal and each sensed conductive strip generates capacitive coupling. Moreover, when the capacitive pen is held on the touch sensor by an external conductive object (e.g. the hand or human body), the control circuit determines the location of the capacitive pen on the touch sensor based on the changes in capacitive coupling produced at the intersections.

Based on the device for detecting an approach or a touch of a small area described above, the control circuit may include: a means for obtaining an image of change in capacitive coupling from a capacitive touch sensor, wherein each value in the image of change in capacitive coupling is the change in capacitive coupling for one of the intersections; a means for detecting each intersection with a value greater than a first threshold from the image of change in capacitive coupling; and a means for determining a single intersection approached or touched by each capacitive pen when at least one intersection with the value greater than the first threshold is detected, wherein all intersections adjacent to the single intersection approached or touched by each capacitive pen are all smaller than the first threshold.

The control circuit may further include: a means for obtaining an image of change in capacitive coupling from a capacitive touch sensor, wherein each value in the image of change in capacitive coupling is the change in capacitive coupling for one of the intersections; a means for detecting each detected intersection from the image of change in capacitive coupling, wherein the value of the detected intersection is smaller than a first threshold and larger than a second threshold; a means for detecting each first region, wherein each first region includes one of the detected intersections and an intersection adjacent to the detected intersection, and the sum of values of the first region is greater than the first threshold; and a means for determining a first region approached or touched by the capacitive pen when at least one first region is detected, wherein the values of all intersections adjacent to the first region approached or touched by the capacitive pen are all smaller than a third threshold.

Furthermore, the control circuit may further include: a means for detecting each second region if no first region is detected, wherein each second region includes four adjacent intersections including one of the detected intersections, and the sum of values of the second region is greater than the first threshold; and a means for determining a second region approached or touched by the capacitive pen when at least one second region is detected, wherein the values of all intersections adjacent to the second region approached or touched by the capacitive pen are all smaller than a third threshold.

In a best mode of the present invention, the first threshold>the second threshold>the third threshold. For example, the second threshold is ½ of the first threshold, and the third threshold is ¼ of the first threshold.

In addition, in an example of the present invention, the maximum width on the touch sensor by the capacitive pen is less than the distance between the centers of two conductive strips arranged adjacent and in parallel with each other, the two conductive strips arranged adjacent and in parallel with each other are the driven conductive strips or the sensed conductive strips. In another example of the present invention, each first region or second region determined to be approached or touched by the capacitive pen is a first region or a second region approached or touched by a pen, wherein the maximum width on the touch sensor touched by the pen is less than or equal to 3 mm.

Figure 4A:
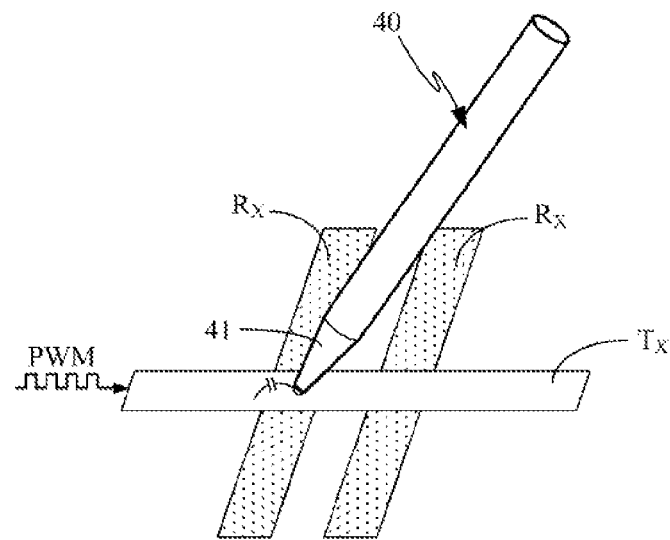
FIGS. 4A and 4B are schematic diagrams illustrating the operating of a capacitive pen proposed by a third embodiment of the present invention.
Figure 4B:
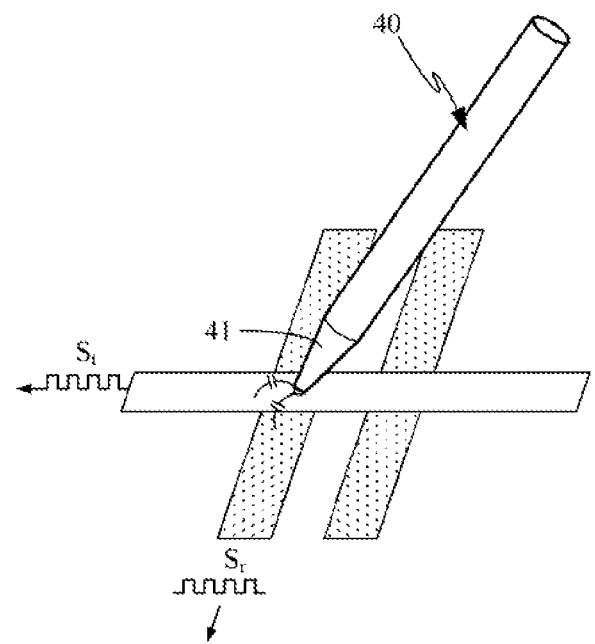

Referring to FIGS. 4A and 4B, a capacitive pen proposed by a third embodiment of the present invention is shown. The capacitive pen includes a conductive pen body 40 and a conductive pen head 41. Referring to FIG. 4A, when the pen head 41 is close to or in contact with a touch sensor, the conductive pen head 41 will be capacitively coupled to a driven conductive strip being provided with a driving signal (e.g. PWM), and then based on the capacitively coupled driving signal, the capacitive pen provides an output signal to the touch sensor via capacitive coupling during a period in which the driving signal is no longer provided to any driven conductive strip, as shown in FIG. 4B. The output signal will be capacitively coupled with the conductive strips of the touch sensor to provide detected signals. For example, the output signal is capacitively coupled with at least one first conductive strip Tx to provide a signal St, and with at least one second conductive strip Rx to provide a signal Sr. By scanning the first conductive strip Tx and the second conductive strip Rx, the location of the capacitive pen can be determined based on the signals St and Sr.

Figure 4C:
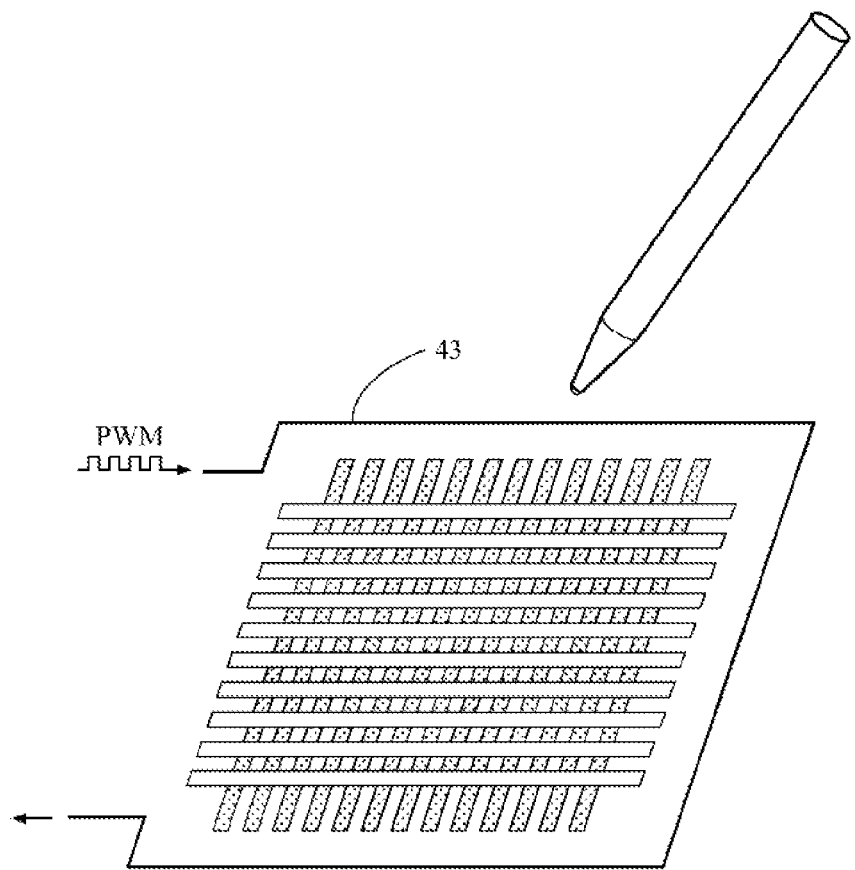
FIG. 4C is a schematic diagram illustrating a shielding conductive strip proposed by the third embodiment of the present invention.

The capacitive pen can have a built-in power supply to provide the power necessary for it to provide the output signal. In addition, the capacitive pen can obtain the power required for producing the output signal through external electromagnetic induction. Referring now to FIG. 4C, a capacitive touch sensor may include at least one shielding conductive strip 43. In a first mode (or period), the shielding conductive strips 43 is provided with a DC signal to shield the conductive strips from external noise interference. Further, the shielding conductive strip 43 is provided with an AC signal in a second mode in order to form a coil that provides a magnetic field, such that a capacitive pen may obtain some or all of its required power via electromagnetic induction from the magnetic field produced by the shielding conductive strip 43. The number of turns on the coil surrounding the conductive strip may be one or more. In addition, the capacitive pen may further include a capacitive or electrical storage device (e.g. a battery) for storing the power received from the coil, and for providing continuous power to the capacitive pen in the absence of the power from the coil.

Figure 4D:
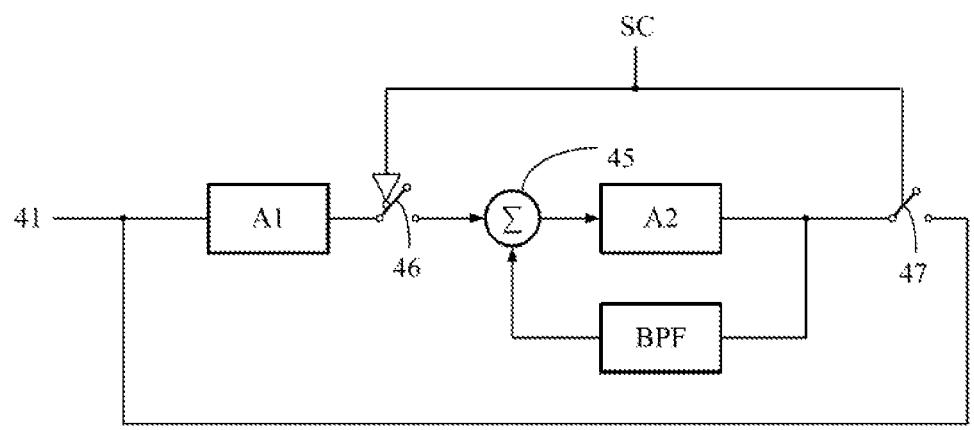
FIG. 4D is a schematic diagram illustrating a circuit for phase synchronization proposed by the third embodiment of the present invention.

FIG. 4D shows a signal conversion circuit inside the capacitive pen as mentioned before. Its main components include a first amplifier A1, an adder 45, a second amplifier A2 and a band pass filter (BPF). After the driving signal is coupled with the conductive pen head 41, the signal brought in by capacitive coupling is amplified by the first amplifier. In addition, the adder, the second amplifier and the BPF together form an oscillating feedback loop to provide an output signal that is in phase with the signal of the touch sensor. The output signal is outputted from the pen head.

One with ordinary skill in the art can appreciate that the adder 45, the second amplifier A2 and the BPF form an oscillating feedback loop, wherein the working frequency of the oscillating feedback loop is the same as the frequency of the driving signal. Before the driving signal is received by the oscillating feedback loop, a delayed driving signal and the driving signal may have different phases. After the driving signal is received by the oscillating feedback loop, the delayed driving signal can be made to have the same phase as the driving signal. When the delayed driving signal is transmitted to the touch sensor, the control circuit may detect the delayed driving signal based on the phase of the original driving signal.

In an example of the present invention, each end of the oscillating feedback loop may further include a switch (switches 46 and 47) controlled by a control signal SC provided by a control circuit. The switches can be used to delay the output of the output signal from the pen head so as to avoid outputting it at the same time the driving signal is being provided. For example, the control signal can be provided based on the output of a counter or a controller (not shown). After certain number of counts or a certain period of time, the output signal of the oscillating feedback loop is allowed to be outputted from the pen head. Accordingly, the driving signal is amplified by the first amplifier A1 and provided to the oscillating feedback loop via the switch 46. At this time, based on the control signal SC, the switch 46 is switched on, while the switch 47 is switched off. After some time, the output signal of the second amplifier A2 in the oscillating feedback loop will be in phase with the driving signal. Then, after a certain number of counts or period of time, the control signal SC controls the switch 46 to be switched off and the switch 47 to be switched on, so that the delayed driving signal can be outputted from the conductive pen head 41 after that certain number of counts or period of time. One with ordinary skill in the art may appreciate that the receiving of the driving signal and the outputting of the delayed driving signal can be implemented by different electrodes, but in a best mode of the present invention, they are implemented by the same electrode. Also, the receiving of the driving signal and the outputting of the delayed driving signal by a single electrode will not occur at the same time.

According to the above, a cordless capacitive writing device is provided by the present invention, which includes: a touch sensor, a capacitive pen and a controller. The capacitive pen includes a conductive pen head and a signal conversion circuit. The conductive pen head receives a driving signal from the touch sensor. The receiving of the driving signal can be achieved by an electrode or a coil. The signal conversion circuit generates a delayed driving signal after delaying a predefined period of time based on the driving signal. The delayed driving signal is transmitted to the touch sensor via the conductive pen head, wherein the driving signal and the delayed driving signal have the same frequency and phase. The delayed driving signal may exist before the receiving of the driving signal, but is not outputted from the conductive pen head. After receiving the driving signal, the signal conversion circuit allows the delayed driving signal to be in phase with the driving signal, and the delayed driving signal is outputted from the conductive pen head after a certain number of counts or period of time.

The controller detects the location of at least one external conductive object based on the change in capacitive coupling of the driving signal between the touch sensor and the at least one external conductive object in a passive mode, and detects the location of at least one external conductive object based on the delayed driving signal received from the capacitive pen in an active mode. In addition, in the passive mode, the controller detects the location of the at least one external conductive object at the same time the driving signal is being provided, whereas in the active mode, the controller detects the location of the capacitive pen in the absence of the driving signal.

Moreover, in the active mode, the driving signal can be provided by scanning the conductive strips one at a time until all of the first conductive strips, all of the second conductive strips or all of the conductive strips (including all of both the first and second conductive strips) have been provided with the driving signal. Alternatively, a plurality of conductive strips can be provided with the driving signal simultaneously. For example, the controller may simultaneously provide the driving signal to all of the first conductive strips, all of the second conductive strips or all of the conductive strips (including all of both the first and second conductive strips). In a best mode of the present invention, the driving signal in the active mode is limited to a predefined frequency, which is not the same as the frequency of the driving signal in the passive mode. In the passive mode, the location of an external conductive object can be determined by aforementioned self capacitive detection or mutual capacitive detection.

In an example of the present invention, the capacitive pen may include a battery, which can be a dry battery or rechargeable battery, to provide the power necessary for the capacitive pen. In another example of the present invention, the capacitive pen may include an internal capacitor that can temporarily store power, and discharge to provide power to the capacitive pen. For example, the touch sensor may further include at least one shielding conductive strip. In the passive mode, the shielding conductive strip is provided with a DC signal to shield the conductive strips from external noise interference, whereas in the active mode, the shielding conductive strip is provided with an AC signal. The shielding conductive strip being provided with the AC signal thus forms a first coil that provides an electromagnetic signal. As shown in FIG. 4C, the shielding conductive strip may surround all of the first conductive strips, all of the second conductive strips or all of the conductive strips (including all of both the first and second conductive strips). In an example of the present invention, the driving signal received by the capacitive pen is provided by the electromagnetic signal generated by the first coil, or by the first coil and some or all of the conductive strips. One with ordinary skill in the art can appreciate that the power received by the capacitive pen can also be provided by external coils of some other forms, for example, by one or more coils not surrounding the conductive strips. In an example of the present invention, the capacitive pen further includes a second coil. The second coil provides the power required for generating the delayed driving signal from the signal conversion circuit through electromagnetic induction with the electromagnetic signal of the first coil. Moreover, the aforementioned internal capacitor stores the power produced by the second coil via electromagnetic induction.

From the descriptions above, it is clear that the capacitive pen of the present invention is particularly suitable for a cordless capacitive pen.

Figure 5A:
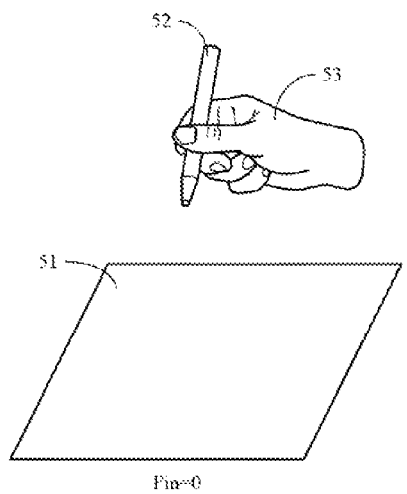
Figure 5B:
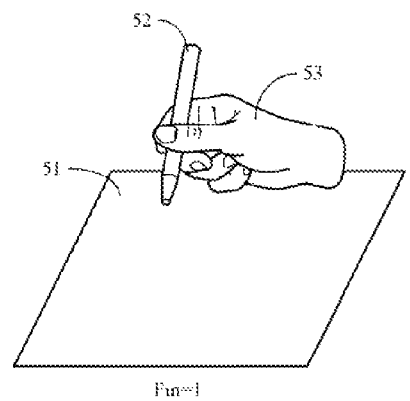

Referring now to FIGS. 5A to 5F, a writing method with palm rejection in accordance with a fourth embodiment of the present invention is shown. As shown in FIG. 5A, when a hand 53 holding a pen 52 is outside a detection range of a touch screen 51, a flag Fin is initialized as 0 (or a false value). When the hand 53 holding the pen 52 is within the detection range of the touch screen 51, as shown in FIG. 5B, the flag Fin is set to 1 (or a true value). In an example of the present invention, when the flag Fin is set to 1, the controller only provides the location of the pen 52, while ignoring the locations of the hand 53 holding the pen 52 and touches/approaches on the touch screen 51 other than the pen 52.

When the flag Fin is set to 1, the controller will continuously determine and record a hand touched area 55 on the touch screen 51 approached or touched by the hand 53 through capacitive detection, as shown in FIG. 5D. For example, an image 56 is provided by mutual capacitive detection, and an area 58 touched or approached by the hand 53 in the image 56 is detected. In an example of the present invention, a predetermined range 59 (e.g. a rectangular or polygonal range) can also be used to broadly include the area 58 touched or approached by the hand 53. When the pen 52 is a capacitive touch pen, and when the pen approaches or touches an area 54 on the touch screen 51, an area 57 touched or approached by the pen 52 will also be generated in the image. In another example of the present invention, the pen 52 can be an electromagnetic pen, so in this case, the area 57 touched or approached by the pen 52 will not be generated in the image. The location of the electromagnetic pen can be detected by an electromagnetic panel having a plurality of coils. In the following descriptions, when the flag Fin is set to 1, the area 58 touched or approached by the hand 53 will be recorded as a recorded area or a recorded image.

When the flag Fin is set to 1, it will be reset to 0 only if the pen and the hand are no longer detected. In an example of the present invention, the recorded area only detects and records the area 58 touched or approached by the hand 53 that is within a certain distance of the area 54 touched or approached by the pen. For example, in a tablet PC, one hand may be holding the tablet PC, while the other writes on it. Some fingers of the hand holding the tablet PC may also press on the PC, and if this area pressed by the hand holding the PC is also included as part of the recorded area, then the flag Fin would be continuously set to 1.

Figure 5E:
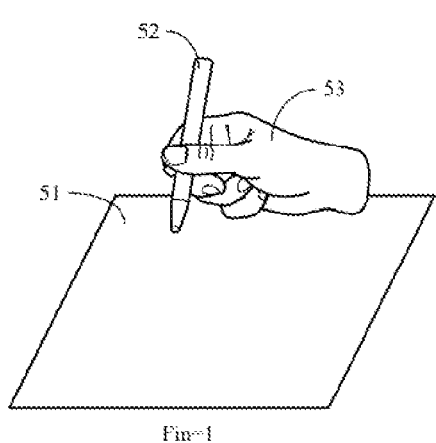

During writing, the pen 52 may move or lift outside the detection range of the touch screen 51, at this time, if the recorded area still includes an approach or touch of a hand, then the flag Fin is still set to 1, as shown in FIG. 5D. It may also be possible that the pen has left the touch screen 51, but is still detected as within the detection range of the touch screen, then the flag Fin is still set to 1, as shown in FIG. 5E.

Figure 5F:
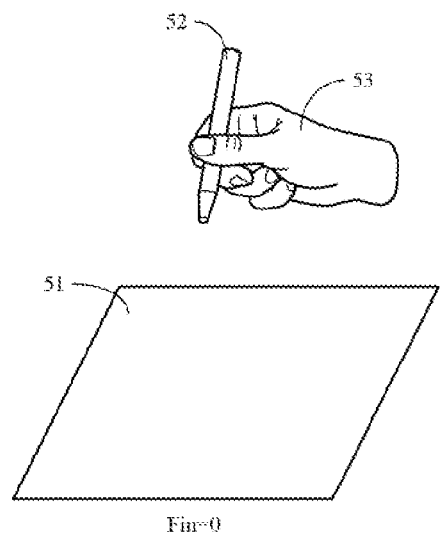

In other words, once the flag Fin is set to 1, the flag Fin will be set to 0 only if the pen and the hand inside the recorded range are no longer detected by the controller (not in the detection range of the touch screen 51), as shown in FIG. 5F.

As a result, a palm rejection mode can be established during writing. Even if the pen moves away from the surface of the touch screen, the touch screen is still in the palm rejection mode, so locations will not be misjudged.

Figure 6:
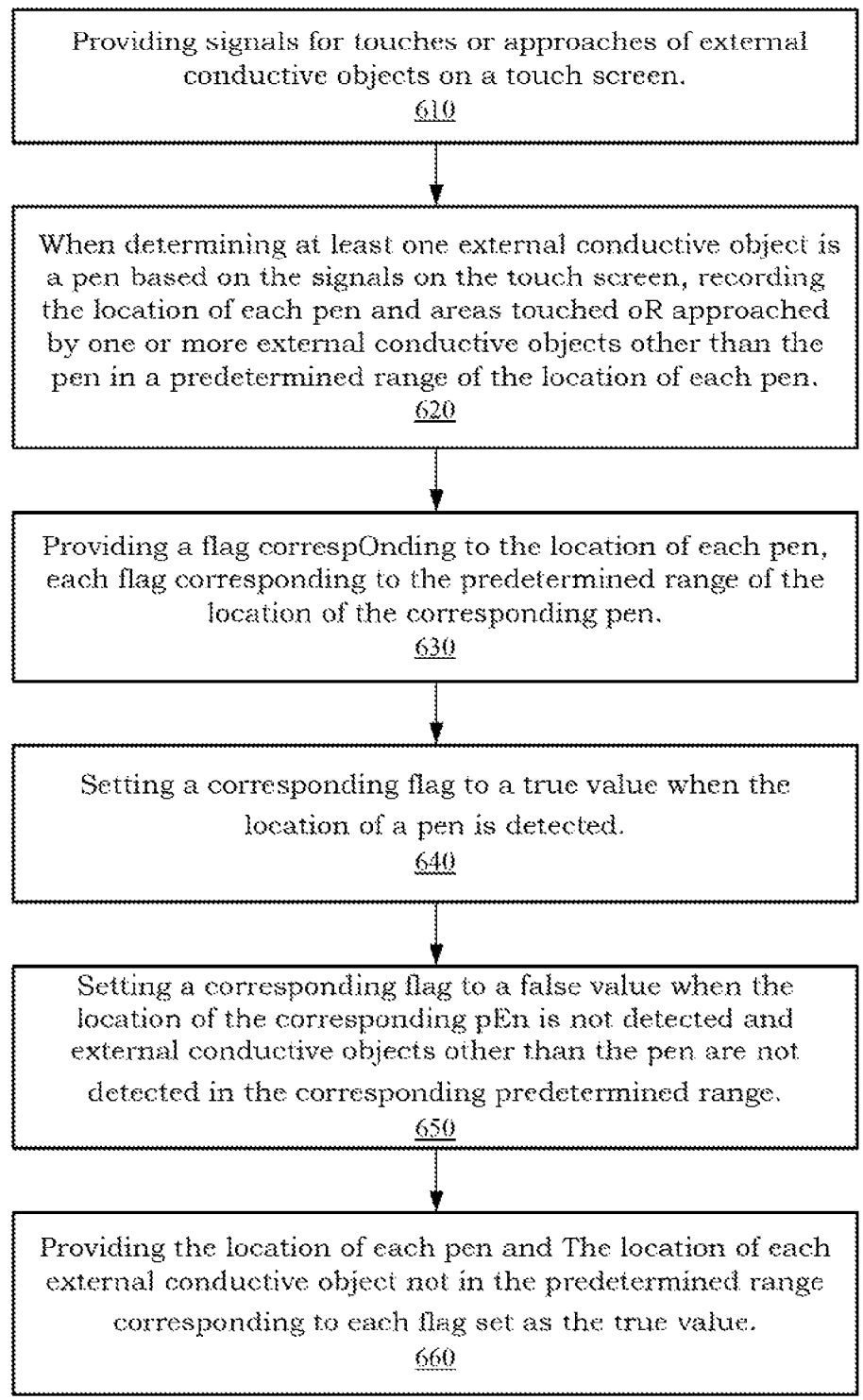
FIG. 6 is schematic flow chart illustrating a writing method with palm rejection in accordance with the fourth embodiment of the present invention.

According to the above, a detection method for a touch screen proposed by the present invention is shown in FIG. 6. In step 610, signals for touches or approaches of external conductive objects on the touch screen are provided. Then, in step 620, when determining at least one external conductive object is a pen based on the signals on the touch screen, the location of each pen and areas touched or approached by one or more external conductive objects other than the pen in a predetermined range of the location of each pen are recorded. Also, in step 630, a flag corresponding to the location of each pen is provided, and each flag corresponds to the predetermined range of the location of the corresponding pen. In addition, in step 640, a corresponding flag is set to a true value when the location of a pen is detected. Next, in step 650, when the location of the pen corresponding to a flag is not detected and the external conductive objects other than the pen are not detected in the corresponding predetermined range, the flag is set to a false value. In addition, in step 660, the location of each pen and the location of each external conductive object not in the predetermined range corresponding to each flag set as the true value are provided.

The above steps 620 to 660 can be performed by the above controller, and the flags can be stored in a memory accessible by the controller. Accordingly, the present invention proposes a detection device for a touch screen, which includes the touch screen, a controller and a memory. The touch screen detects signals indicating approaches or touches on the touch screen by external conductive objects. The touch screen can be those touch screens described above, or of the types such as electromagnetic, infrared, analog matrix resistive (AMR), resistive, optical, surface acoustic wave (SAW) and etc. The touch screen is not limited to a single type, but can be a combination of more than two types. For example, an electromagnetic pen is used, and palms are detected by capacitive detection. Alternatively, a resistive pen is used, and palms are detected by capacitive detection. Therefore, any type of touch screen is applicable to the present embodiment as long as it can distinguish between a pen and a palm. For example, a touch screen of a single type (e.g. capacitive or AMR) can be used for detection, and the size of the area touched or approached by an external conductive object will be used to determine whether it is a pen or a palm.

When the controller detects the location of a pen without a corresponding flag, a flag for the location of the pen is then added. The flags can be deleted upon being set to the false value, or after they have been set to the false value for a period of time, or the flags set to the false value can be deleted periodically. The controller provides the location of each pen and the location of each external conductive object in each predetermined range corresponding to a flag set as the true value.

During writing, the pen may leave the surface of the touch screen, and the controller may not detect the pen as a result. Meanwhile, the flag corresponding to the pen leaving the surface of the touch screen still maintains the latest predetermined range. In other words, the predetermined range corresponding to a flag will move with the location of the corresponding pen, when that pen is no longer detected (no long exists), the flag still maintains the latest predetermined range.

In a best mode of the present invention, the number of pen that can be used is limited to just one. This is applicable to most of the systems and touch screens, and has the broadest range of applications. In the case that there can only be one pen and the predetermined range is the whole touch screen, when a flag for a pen is set to the true value, only the location of the pen is provided, not the locations of external conductive objects other than the pen. Of course, as mentioned in the previous example, the predetermined range can also be just slightly larger than the size of a palm, so when a flag for a pen is set to the true value, the location of the pen as well as the location of each external conductive object that is not within the predetermined range are provided.

Moreover, the controller may track the location of each external conductive object by determining the historical trajectory of the external conductive object. If the external conductive object leaves the touch screen, as long as the location when it left and the location when it came back are within a predetermined range, then it is regarded as the same external conductive object. In addition, as long as the original flag is still the true value, the external conductive object corresponds to the original flag.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. A detection device for a touch screen, comprising:
   the touch screen for detecting signals for approaches or touches of external conductive objects thereon;
   a controller for, when determining at least one external conductive object is a pen based on the signals on the touch screen, recording a location of each pen and areas touched or approached by one or more external conductive objects other than the pen in a predetermined range of the location of each pen; and
   a memory for storing a flag corresponding to the location of each pen, each flag corresponding to the predetermined range of the location of a corresponding pen, the flag being set to a true value when an existence of the corresponding pen is detected by the controller, and the flag being set to a false value only if the existence of the corresponding pen is not detected, and only if an existence of any external conductive object other than the pen in the corresponding predetermined range is not detected by the controller, wherein an area of the predetermined range is smaller than an area of the touch screen,
   wherein a plurality of locations of all the external conductive objects other than the pen in the predetermined range corresponding to a flag being set to the true value are not provided by the controller.

2. The detection device of claim 1, wherein there is only one pen and the predetermined range is a whole touch screen, and when a flag corresponding to the pen is set to the true value, the controller provides only the location of the pen but not the locations of the external conductive objects other than the pen.

3. The detection device of claim 1, wherein when the location of the pen corresponding to a flag is not detected, the corresponding predetermined range remains at the latest predetermined range.

4. The detection device of claim 1, wherein a range of a palm moves with the location of a corresponding pen.

5. The detection device of claim 1, wherein the controller deletes a flag being set to the false value, and when the location of a pen without a corresponding flag is detected, the controller adds a flag for the location of the pen.

6. A detection method for a touch screen, comprising:
   providing signals for approaches or touches of external conductive objects on a touch screen;
   when determining at least one external conductive object is a pen based on the signals on the touch screen, recording a location of each pen and areas touched or approached by one or more external conductive objects other than the pen in a predetermined range of the location of each pen, wherein an area of the predetermined range is smaller than an area of the touch screen;
   providing a flag corresponding to the location of each pen, and each flag corresponding to the predetermined range of a location of the corresponding pen;
   setting the flag to a true value when the location of the corresponding pen is detected;
   setting the flag to a false value only if the location of the corresponding pen is not detected, and only if any external conductive object other than the pen in the corresponding predetermined range is not detected; and
   providing a location of each pen and a location of each external conductive object not in the predetermined range corresponding to each flag being set to the true value.

7. The detection method of claim 6, wherein there is only one pen and the predetermined range is a whole touch screen, wherein when a flag corresponding to the pen is set to the true value, only the location of the pen but not the locations of external conductive object other than the pen is provided.

8. The detection method of claim 6, wherein when the location of the pen corresponding to a flag is not detected, the corresponding predetermined range remains at the latest predetermined range.

9. The detection method of claim 6, wherein a range of a palm moves with the location of a corresponding pen.

10. The detection method of claim 6, wherein a flag being set to the false value is deleted, and when the location of a pen without a corresponding flag is detected, a flag for the location of the pen is added.

* * * * *